United States Patent [19]

Ishikawa et al.

[11] Patent Number: 5,127,345
[45] Date of Patent: Jul. 7, 1992

[54] COMBUSTION APPARATUS AND COMBUSTION CONTROL METHOD THEREFOR

[75] Inventors: Ryuichi Ishikawa, Tokyo; Takahiro Ohshita; Chikao Goke, both of Kanagawa; Kiyoshi Asai, Tokyo, all of Japan

[73] Assignee: Ebara Corporation, Tokyo, Japan

[21] Appl. No.: 787,740

[22] Filed: Nov. 4, 1991

Related U.S. Application Data

[63] Continuation of Ser. No. 465,203, Mar. 1, 1990, abandoned.

[30] Foreign Application Priority Data

| Oct. 20, 1988 | [JP] | Japan | 63-264861 |
| Oct. 26, 1988 | [JP] | Japan | 63-270311 |
| Nov. 29, 1988 | [JP] | Japan | 63-303372 |

[51] Int. Cl.$^5$ ............................ F23G 7/00; F22B 1/02
[52] U.S. Cl. .................................. 110/245; 122/4 D
[58] Field of Search ................ 122/4 D; 110/245; 432/58, 15

[56] References Cited

U.S. PATENT DOCUMENTS

| 4,111,158 | 9/1978 | Reh et al. | 122/4 D |
| 4,273,073 | 6/1981 | Robinson | 122/4 D |
| 4,548,138 | 10/1985 | Korenberg | 122/4 D |
| 4,694,758 | 9/1987 | Gorzegno et al. | 110/245 |

FOREIGN PATENT DOCUMENTS

| 53-105071 | 9/1978 | Japan. |
| 58-156107 | 9/1983 | Japan. |
| 59-43682 | 10/1984 | Japan. |
| 60-29508 | 2/1985 | Japan. |
| 60-86320 | 5/1985 | Japan. |
| 61-9246 | 3/1986 | Japan. |
| 61-173020 | 8/1986 | Japan. |
| 61-215210 | 9/1986 | Japan. |
| 62-182519 | 8/1987 | Japan. |
| 62-194106 | 8/1987 | Japan. |
| 63-24201 | 5/1988 | Japan. |
| 63-189709 | 8/1988 | Japan. |
| 63-279013 | 11/1988 | Japan. |

Primary Examiner—Henry C. Yuen
Attorney, Agent, or Firm—Wenderoth, Lind & Ponack

[57] ABSTRACT

A combustion apparatus has a combustion furnace section, a free board section which is downstream of the combustion furnace section, and a post-combustion chamber which is downstream of the free board section, the post-combustion chamber being disposed at a position offset from the position directly above the free board section, wherein the apparatus is characterized in that a gas blowing structure is provided in the vicinity of the boundary between the free board section and the post-combustion chamber, the gas blowing structure having a plurality of pipes disposed parallel to each other at a predetermined spacing, each pipe being provided with a gas outlet hole for blowing a gas, for example, air, counter to the combustion gas flowing toward a discharge port. With this arrangement, when a gas is blown in from the gas blowing structure counter to the combustion gas, a large whirling flow, in which the combustion gas and the gas thus blown mix together, is generated in the free board section, so that unburnt gas and combustion air are thoroughly mixed together within the free board section, thus enabling complete combustion.

10 Claims, 9 Drawing Sheets

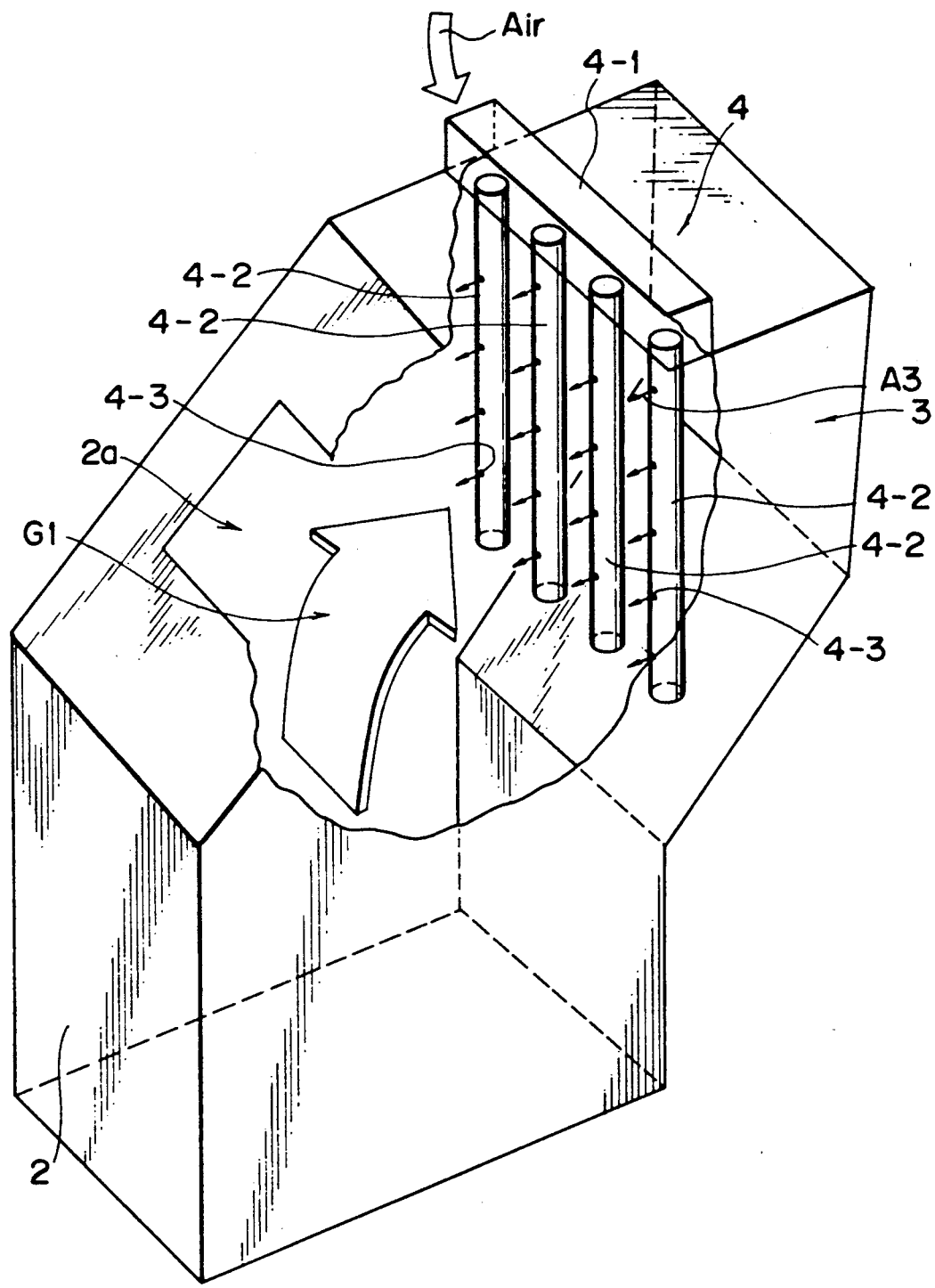

COMBUSTION APPARATUS AND COMBUSTION CONTROL METHOD THEREFOR

This application is a continuation of application Ser. No. 07/465,203, filed on Mar. 1, 1990, now abandoned.

TECHNICAL FIELD

The present invention relates to a combustion apparatus, for example, a furnace for incinerating waste such as urban refuse, wherein high-temperature and high-efficiency combustion is achieved with a low air ratio, thereby preventing emission of trace amounts of harmful substances, for example, dioxins, and effecting combustion with a high combustion efficiency, and also relates to a combustion controller therefor.

BACKGROUND ART

Recently, the amounts of plastics, fibers, paper, etc. contained in urban refuse have been increasing due to diversification of physical distribution systems and the like and there has therefore been a growing tendency for urban refuse to become high-calorie refuse.

Plastics, which cause local high-temperature heat generation during the incineration process, damage the refractories or generate clinkers, thus obstructing the continuous operation of the furnace and the incineration of refuse at a rated capacity. Therefore, plastic may be sorted out as being a substance unsuitable for incineration. However, it is difficult to completely remove all of it from the refuse. Further, if such refuse is not incinerated but used for land reclamation, substances which would otherwise be used as valuable energy sources are dumped without being effectively utilized.

In addition, since the gas temperature at the furnace outlet is maintained at 700° C. to 950° C. to incinerate high-calorie refuse as it is, cooling must be effected with a large amount of air or spray water, so it is the present trend for the size of the furnaces to increase. The lower limit value (700° C.) for the furnace outlet gas temperature is set principally with a view to preventing offensive odors. The upper limit value (950° C.) is set from the viewpoint of the furnace operation so that dust which melts at high temperature will not adhere to the flue or the like downstream of the outlet of the combustion chamber so as to avoid trouble.

On the other hand, in November, 1983, harmful dioxins and the like were detected in mechanical furnaces of the stoker type, which gave rise to a social problem. It is considered that plastics are the main cause of generation of harmful organic chlorine compounds, including polychlorodibenzoparadioxins (hereinafter abbreviated as "PCDDs") and polychlorodibenzofurans (PCDFs) which are chemically very similar to the PCDDs. At present, generation of such organic chlorine compounds takes place irrespective of the type of furnaces, whether mechanical furnaces or fluidized bed furnaces.

It has heretofore been pointed out by many researchers that chlorobenzenes (CBs) and chlorophenols (CPs) are strongly related to generation of such harmful compounds, as being precursors thereof. It has been reported that the amount of generation of such harmful compounds is likely to increase as the exhaust gas flows from the furnace to the flue, that is, as the exhaust gas temperature decreases, and that these harmful compounds are generated by the electric discharge effect within the electric precipitator.

Although most of the mechanism of generation of PCDDs and the like in the furnaces has not yet been clarified, it is generally said that these compounds are generated at a temperature not higher than 700° C. and are decomposed by oxidation treatment at 900° C. to 1200° C.

In the case of a mechanical furnace, the inside of the waste stacked on the stoker in the furnace bottom is in a baked state at 300° C. to 400° C.; therefore, this is a region where dioxins are likely to be generated. Moreover, since the air ratio for combustion in a mechanical furnace is as high as 2 or more, the rate at which the refuse is cooled by air is high, so that it is difficult to raise the temperature in the upper part of the furnace to 1200° C. unless the calorific value of the object of combustion is high. If the calorific value is high, the temperature becomes locally high, which causes problems such as damage to the refractories and generation of clinkers.

In the case of a fluidized bed furnace, the furnace bottom is constituted of a fluidized bed formed from a fluidizing medium, for example, siliceous sand, and the furnace is usually operated at about 700° C. to 900° C. Therefore, it is more advantageous than the above-described mechanical furnace. However, the fluidized bed furnace has a complicated chemical reaction region in the fluidized bed, so that it cannot be said to be possible to reliably prevent generation of dioxins or the like even with the fluidized bed.

In general, fluidized bed furnaces that burn refuse use siliceous sand ($SiO_2$) having an average particle diameter of about 0.4 to 2.0 mm as a fluidizing medium and maintain the temperature of the fluidized bed formed from the fluidizing medium at about 700° C. to 900° C. to burn the refuse fed into the fluidized bed and further return the heat generated by combustion to the fluidizing medium to effect incineration.

Incidentally, the siliceous sand that is used as a fluidizing medium reacts with the following alkali metal compounds in a high-temperature region to form, for example, sodium silicate ($Na_2O \cdot 3SiO_2$) in the form of water-glass, which cannot be fluidized; therefore, the temperature of the fluidized bed is limited by each particular object of combustion:

$$3SiO_2 + Na_2CO_3 \rightarrow Na_2O \cdot 3SiO_2 + CO_2$$

$$3SiO_2 + 2NaOH_3 \rightarrow Na_2O \cdot 3SiO_2 + H_2O$$

$$3SiO_2 + 2Na_2HCO_3 \rightarrow Na_2O \cdot 3SiO_2 + H_2O + 2CO_2$$

More specifically, in a case where the weight proportion of the Na component (hereinafter referred to as Na concentration), as being a representative of the alkali metal compounds, to the amount of fluidizing medium ($SiO_2$) is not greater than about 0.5% (i.e., in the case of ordinary urban refuse), the fluidized bed temperature must be limited to 900° C. at maximum. In the case of sludge, industrial waste or the like which has a high content of alkali metal compounds and in which the Na concentration in the fluidizing medium is about 1%, the fluidized bed temperature must be limited to about 750° C., paying some attention to safety. It should be noted that in order to suppress the reaction of sand and $Na_2CO_3$ or $NaOH$, a certain melt retarder, for example, kaolin, can be added as an additive to incinerate waste containing alkali metal compounds or the like in the fluidized bed furnace. However, it is known that there is still a limitation on the concentration of alkali metal compounds in the waste that can be supplied per unit of time with respect to the amount of fluidizing sand retained; that is, there is a limit beyond which fluidization stops even if a large amount of melt retarder is added.

In a test of an experimental fluidized bed furnace, the Na concentration in sand at the time when the fluidization of the object of combustion undesirably stopped due to alkali metal compounds at a fluidizing medium ($SiO_2$) temperature of about 800° C. was about 0.6 to 1.8%, although it was dependent on the kind of alkaline metal compounds and the melt retarder used. If the particle diameter of the melt retarder added is small, the retarder may scatter as soon as it is cast into the furnace, resulting in no effectiveness. Further, addition of a melt retarder involves disadvantages, for example, a rise in the cost and an increase in the load on the devices in the subsequent stages, and therefore cannot be an effective measure to cope with the problem due to the presence of alkali metal compounds.

It is known that, when a variety of alkali metal compounds coexist together, they constitute a eutectic point and therefore melt at a lower temperature than the melting point of each of them when present alone. This is an important matter which must be taken into account when the fluidized bed furnace is operated and controlled. Since it is practically impossible to regulate the amount of alkali metal compounds mixed in urban refuse, it is important to control the temperature of the fluidized bed.

Accordingly, it is preferable in the fluidized bed furnace also to maintain the fluidized bed temperature at a level not higher than 900° C., maintain the temperature of the free board section in the upper part of the furnace at 900° C. to 1200° C. and treat organic chlorine compounds such as dioxins and precursors thereof at a high temperature by mixing them with a sufficient amount of oxygen.

In addition, the melting point of fly ash in furnaces for incinerating urban refuse is about 1200° C.; therefore, if the free board section is heated to 1200° C. or higher, the problem of molten fly ash adhering to the flue is likely to occur.

In view of the foregoing points, the present invention aims at eliminating the above-described problems arising when waste, for example, urban refuse, is incinerated with a combustion apparatus such as a fluidized bed furnace or the like, and at providing a high-temperature and high-efficiency combustion apparatus and a combustion control method thereof which does not generate harmful substances such as dioxins.

DISCLOSURE OF THE INVENTION

To attain the above-described object, the present invention provides a combustion apparatus having a combustion furnace section, a free board section and a post-combustion chamber which is subsequent to the free board section, the post-combustion chamber being disposed at a position offset from the position directly above the free board section, characterized by providing a gas blowing means in the vicinity of the boundary between the free board section and the post-combustion chamber to blow a gas counter to the combustion gas flowing toward a discharge port.

The present invention is further characterized in that the gas blowing means comprises a plurality of pipes disposed parallel to each other at a predetermined spacing, each pipe being provided with a gas outlet hole for blowing a gas counter to the combustion gas flowing toward the discharge port.

The present invention is further characterized in that the gas outlet holes provided in the plurality of pipes, respectively, are out of phase with each other.

The present invention is further characterized in that the pipes are formed from sintered $\beta$-type silicon carbide.

The present invention is further characterized in that a high-temperature heat exchanger is connected to the post-combustion chamber and gas cooling equipment is provided in the rear of the heat exchanger.

The present invention is further characterized in that the combustion furnace section is a fluidized bed furnace and that the amount of primary air blown in from the bottom of the fluidized bed furnace is set so as to be not greater than the theoretical amount of air so that partial burning of an object of combustion is effected in the fluidized bed section, thereby maintaining the temperature of the fluidized bed incineration section at 400° C. to 900° C.

The present invention is further characterized in that the primary air blown in from the bottom of the fluidized bed is preheated to a predetermined temperature by a two-stage preheating means comprising an air preheater and the high-temperature heat exchanger to reduce the amount of primary air, thereby reducing the amount of heat generated in the fluidized bed and also maintaining the temperature of the fluidized bed at 400° C. to 900° C.

The present invention is further characterized in that secondary air which is preheated in a high-temperature heat exchanger is blown into the free board section, that the air ratio is controlled at 1.0 to 1.5 to form a high-temperature oxidizing atmosphere and that secondary air which is preheated in the high-temperature heat exchanger is blown in by the gas blowing means so as to thoroughly mix together unburnt gas and combustion air, thereby effecting high-temperature and high-efficiency combustion at 950° C. or higher with an overall air ratio of 1.2 to 1.7 in the free board and the post-combustion chamber.

The present invention is further characterized in that the temperatures of the fluidized bed, the free board section and the post-combustion chamber are controlled by varying the air amount ratio between the primary air, the secondary air blown into the free board section and the secondary air blown in from the gas blowing means 4 and also varying the temperatures of these airs.

BRIEF DESCRIPTION OF THE DRAWINGS

FIG. 3 is a perspective view schematically showing the structure of gas blowing means;

BEST MODE FOR CARRYING OUR THE INVENTION

The mode for carrying out the present invention will be described below with reference to the drawings.

Figure 1:
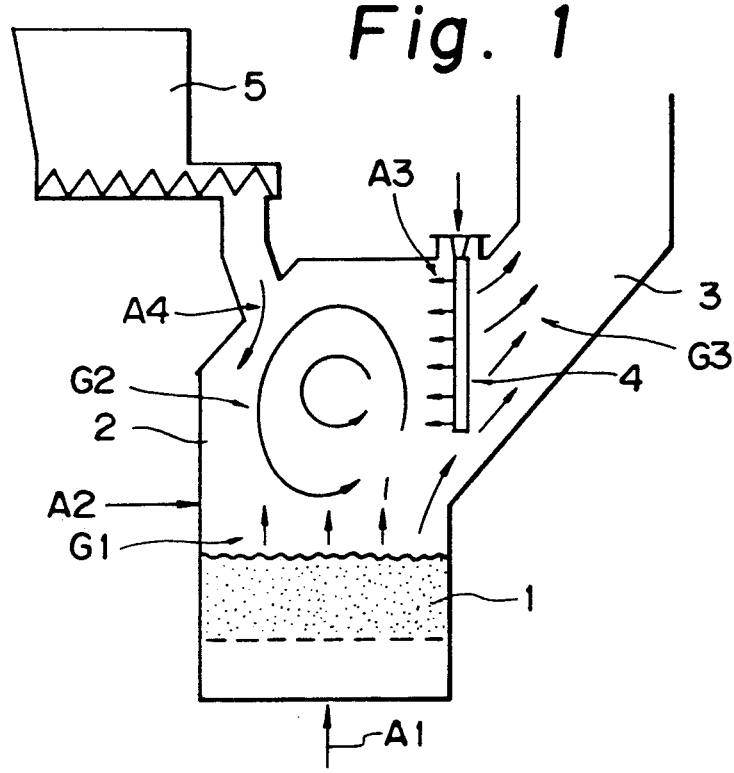
FIG. 1 is a view schematically showing the arrangement of a combustion apparatus and the flow of combustion gas according to the present invention.

Referring to FIG. 1, reference numeral 1 denotes a fluidized bed incineration section. A free board section 2 is disposed above the fluidized bed incineration section 1, and a post-combustion chamber 3 is disposed down stream of the free board section 2. The post-combustion chamber 3 is disposed at a position offset from a position directly above the free board section 2. In the vicinity of the boundary between the free board section 2 and the post-combustion chamber 3 is provided a gas blowing means 4 comprising a plurality of pipes disposed parallel to each other at a predetermined spacing, as described later. Each of the pipes constituting the gas blowing means 4 is provided with gas outlet holes for blowing secondary air counter to the combustion gas flowing toward a discharge port, as described later.

In the down stream end of the post-combustion chamber 3 is provided a gas cooling means (not shown), for example, a gas cooler. The portion that is sandwiched between the gas cooling means and the gas blowing means 4 corresponds to the so-called post-combustion chamber 3.

The reference numeral 5 denotes a refuse feeder for feeding objects for combustion, for example, urban refuse, into the furnace.

In the combustion apparatus having the above-described arrangement, primary air $A_1$ for fluidizing a fluidizing medium is blown in from the bottom of the fluidized bed constituting the fluidized bed incineration section 1, and secondary air $A_2$ is blown into the inside of the free board section 2. Further, secondary air $A_3$ is blown into the gas blowing means 4.

Figure 2:
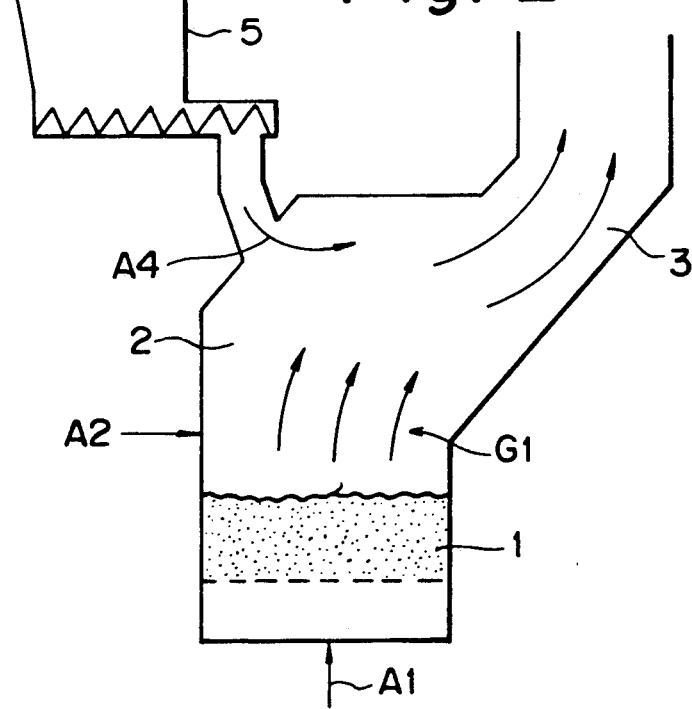
FIG. 2 is a view schematically showing the arrangement of a conventional combustion apparatus and the flow of combustion gas.

In the combustion apparatus arranged as described above, if there is no gas blowing means 4, the refuse that is fed into the furnace from the refuse feeder 5 burns in the fluidized bed incineration section 1 and the combustion gas $G_1$ rises in the free board section 2 and flows toward the discharge port (not shown) through the post-combustion chamber 3, as shown in FIG. 2. In the free board section 2, the secondary air $A_2$ blown into the free board section 2 is mixed with the combustion gas $G_1$, thereby enabling unburnt gas and the air to be mixed together. With this arrangement, however, unburnt gas and the air cannot sufficiently be mixed together, so that short-pass of the combustion gas $G_1$ may occur in the free board section 2 and the residence time may be insufficient.

In this embodiment, therefore, the gas blowing means 4 is provided in the vicinity of the boundary between the free board section 2 and the post-combustion chamber 3 to blow in secondary air $A_3$ horizontally from the gas blowing means 4 counter to the secondary air $A_2$ and combustion gas $G_1$ flowing toward the discharge port, thus causing the mixed exhaust gas $G_2$ of the secondary air $A_2$ and the combustion gas $G_1$ to whirl within the free board section 2 in the form of a large whirling flow, as shown in FIG. 1. Thus, the unburnt gas and the combustion air are satisfactorily mixed together, and since there is no short-pass, the residence time of the combustion gas in the free board section 2 increases. The combustion gas $G_3$ that is satisfactorily mixed with the secondary air $A_3$ blown in from the gas blowing means 4 and the secondary air $A_2$ blown into the free board section 2 further burns in the post-combustion chamber 3 and then flows toward the discharge port.

The air $A_4$ which leaks into the furnace from the refuse feeder 5, together with the objects for combustion, is also mixed with the whirling mixed exhaust gas $G_2$ and is carried downwardly toward the fluidized bed 1.

FIG. 3 is a perspective view schematically showing the structure of the gas blowing means 4. As illustrated, in the vicinity of the boundary between the free board section 2 and the post-combustion chamber 3 are disposed a plurality of pipes 4-2 in parallel to each other at a predetermined spacing so as to extend in a plane perpendicular to the flow path of the combustion gas $G_1$. The upper parts of the pipes 4-2 open into an air supply passage 4-1 and are thus connected together. The pipes 4-2 are provided with air outlet ports 4-3 which are out of phase with each other. Air that is supplied from the air supply passage 4-1 is jetted out from the air outlet ports 4-3 in the pipes 4-2 counter to the combustion gas $G_1$.

Objects for combustion, for example, urban refuse, are fed into the furnace from an inlet port 2a formed in the upper wall of the free board section 2, and the combustion gas $G_1$ rises in the free board section 2. The combustion gas $G_1$ is a mixture of combustion gases such as $CO_2$, $H_2O$, $N_2$, etc., pyrolysis gas from the object of combustion, unburnt substances, for example, unburnt carbon, and air which does not contribute to the combustion. In the free board section 2, the components of the combustion gas $G_1$ are non-uniformly distributed due to non-uniform combustion in the combustion region. By blowing in the secondary air $A_3$ counter to the combustion gas $G_1$ from the air outlet ports 4-3 in the pipes 4-2 constituting the gas blowing means 4, the combustion gas $G_1$ mixes with the secondary air $A_3$ to form a mixed exhaust gas $G_2$ which is a large whirling flow whirling in the free board section 2, as shown in FIG. 1. At this time, the secondary air $A_2$ blown into the free board section 2 and air $A_4$ which leaks thereinto together with the object of combustion from the refuse feeder 5 are also mixed with the exhaust gas 62, as described above.

Figure 4A:
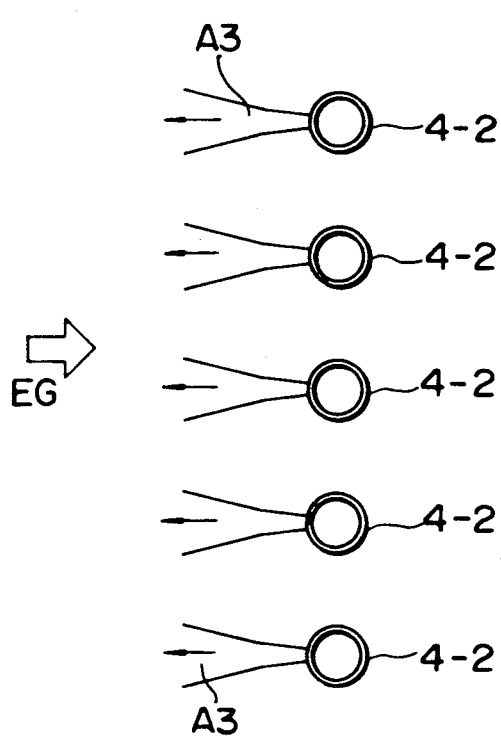
FIG. 4(A) is a plan view showing the way in which pipes constituting the gas blowing means are arranged.
Figure 4B:
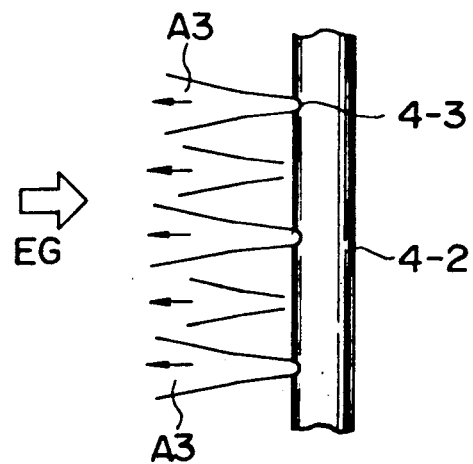
FIG. 4(B) is a side view of the pipes shown in FIG. 4(A)

The plurality of pipes 4-2 constituting the gas blowing means 4 are provided with air outlet ports 4-3 in such a manner that the air outlet ports 4-3 in each pair of adjacent pipes 4-2 are out of phase with each other, that is, when viewed along the line of parallel pipes, the ports 4-3 in alternate pipes are between ports 4-3 in the pipes on either side thereof as shown in FIGS. 4(A) and 4(B), thereby enabling the secondary air $A_3$ to be reliably and uniformly blown in counter to the combustion exhaust gas EG (the mixed exhaust gas $G_2$ shown in FIG. 1). By blowing in the secondary air $A_3$ counter to the flow of the combustion exhaust gas EG, the gas EG is whirled in the free board section 2 in the form of a large whirling flow. FIG. 4(A) is a plan view showing the way in which the pipes 4-2 constituting the gas blowing means 4 are arranged and FIG. 4(B) is a side view of the pipes 4-2.

Further, by providing the gas blowing means 4 comprising a plurality of pipes 4-2 disposed parallel to each other at a predetermined spacing within a vertical plane EG in the vicinity of the boundary between the free board section 2 and the post-combustion chamber 3, as described above, and past which plane the combustion gas EG flows to the post-combustion chamber, the gas blowing means 4 functions as a means for intercepting radiation from the combustion exhaust gas EG upstream thereof and it is therefore possible to expect prevention of lowering in temperature due to radiation.

In the gas blowing means 4 having the above-described structure, a material for the pipes 4-2 may be properly selected in accordance with the temperature of the combustion exhaust gas EG, the content of corrosive substances, etc. However, in the case of a high-temperature and highly corrosive exhaust gas, it is preferable to employ a sintered material formed from one or more materials selected from among silicon carbide, silicon nitride, alumina, zirconia, magnesia, sialon, cosellaite, titanium oxide, etc. $\beta$.SiC is particularly preferable from the viewpoint of strength and thermal shock resistance.

Figure 5A:
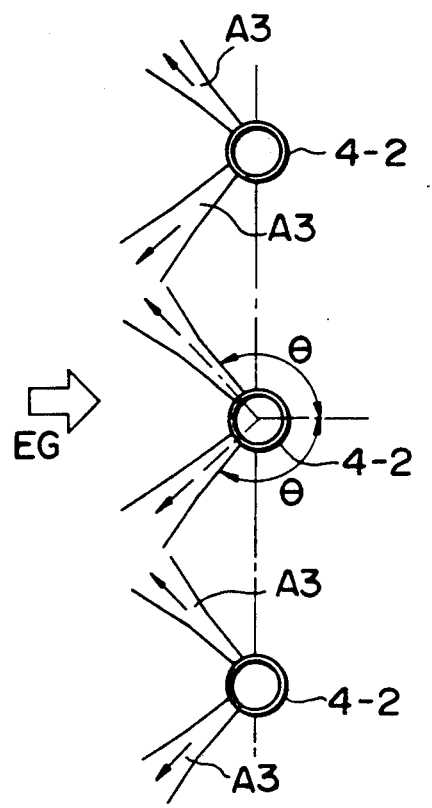
FIG. 5(A) is a plan view showing the way in which pipes constituting another gas blowing means are arranged.
Figure 5B:
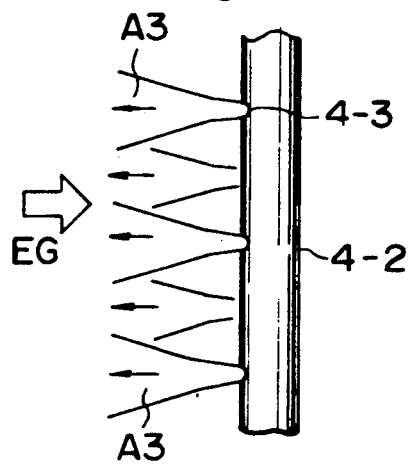
FIG. 5(B) is a side view of the pipes shown in FIG. 5(A)

The angle ($\theta$) between the direction of flow of the combustion exhaust gas EG and the direction of jetting of the secondary air $A_3$ is preferably set within the range of $90° \leq \theta \leq 180°$, as shown in FIG. 5(A). If the spacing between the pipes 4-2 is large, $\theta$ is reduced, and in order to produce a large whirling flow in the free board section 2 by blowing in the secondary air $A_3$ counter to the combustion exhaust gas EG, the range of $120° \leq \theta \leq 150°$ is more preferable. FIG. 5(A) is a plan view showing the way in which the pipes 4-2 constituting the gas blowing means 4 are arranged and FIG. 5(B) is a side view of the pipes 4-2.

Although the cross-sectional shape of the pipes 4-2 constituting the gas blowing means 4 is not limited to the cylindrical configuration shown in FIGS. 4 and 5, it is preferable to form them in a cylindrical configuration so that no thermal stress occurs in the case where the pipes 4-2 are used in high temperature conditions and a ceramic material, which is a brittle material, is employed as a material for the pipes 4-2.

Figure 6:
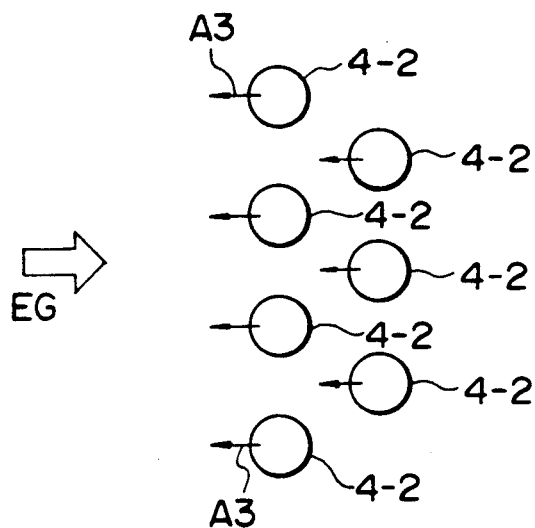
FIGS. 6 and 7 are plan views each showing the way in which pipes constituting another gas blowing means are arranged.

Further, the manner of installation of the pipes 4-2 is not limited to the arrangement that the pipes 4-2 are disposed in a row in a plane perpendicular to the flow of the combustion exhaust gas EG, and the pipes 4-2 may be arranged in two or more staggered rows, as shown in FIG. 6.

Figure 7:
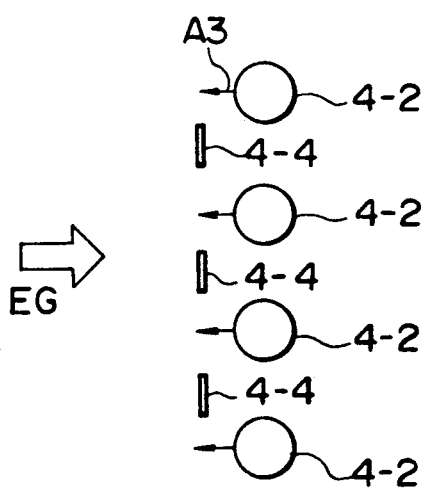

In addition, a plate member 4-4 may be disposed between each pair of adjacent pipes 4-2, as shown in FIG. 7.

Although the foregoing combustion apparatus has been described by way of an example in which a fluidized bed furnace is employed as an incineration furnace, it should be noted that the present invention is not limited to the fluidized bed furnace and that the present invention may, as a matter of course, be applied to other types of furnaces, for example, mechanical furnaces, provided that the furnaces are designed to incinerate urban refuse or other similar objects for combustion.

Figure 8:
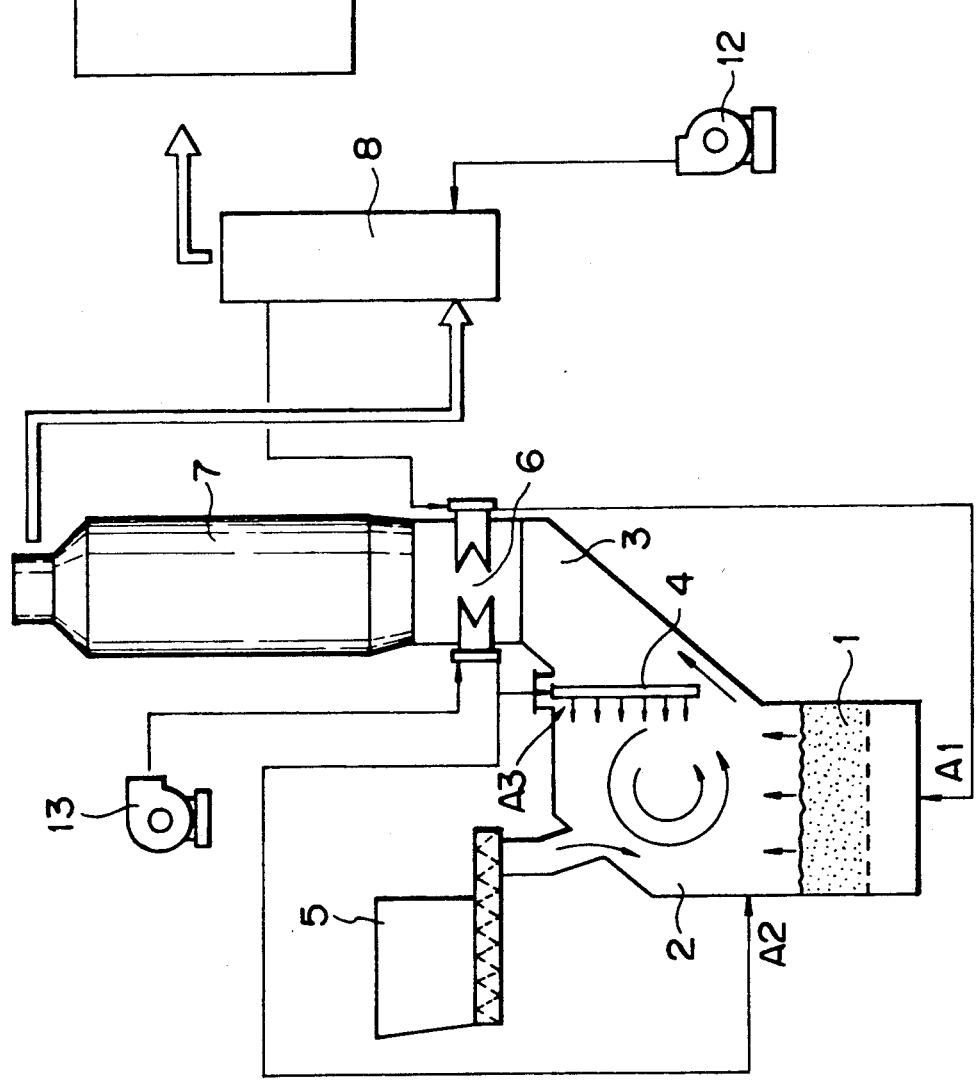
FIG. 8 is a schematic view showing the system arrangement of another combustion apparatus according to the present invention.

FIG. 8 is a schematic view showing the system arrangement of a combustion apparatus according to the present invention. In the figure, the reference numeral 1 denotes a fluidized bed incineration section, 2 a free board section, and 3 a post-combustion chamber. The post-combustion chamber 3 is disposed at a position offset from a position directly above the free board section 2, and in the vicinity of the boundary between the free board section 2 and the post-combustion chamber 3 is provided a gas blowing means 4 for blowing a gas counter to the combustion gas flowing toward a discharge port, in the same way as in the case of the combustion apparatus shown in FIG. 1.

A high-temperature heat exchanger 6 is disposed in connection with the post-combustion chamber 3, the high-temperature heat exchanger 6 being formed integral with a gas cooler 7. Exhaust gas from the gas cooler 7 passes through an air preheater 8 and a dust collector 9 and is then released into the atmosphere through a smoke stack 11 by the action of an induction fan 10. The reference numeral 12 denotes a primary air blower. The air that is sent by the primary air blower 12 is preheated in the air preheater 8 and then further preheated to a predetermined temperature (e.g., 500° C.) in the high-temperature heat exchanger 6 before being blown into the fluidized bed from the bottom of the fluidized bed incineration section 1. The reference numeral 13 denotes a secondary air blower. The air that is sent by the secondary air blower 13 is preheated to a predetermined temperature in the high-temperature heat exchanger 6 and then blown into the free board section 2 as the secondary air $A_2$.

The gas blowing means 4 has substantially the same structure as that of the gas blowing means 4 shown in FIG. 3. The air that is sent by the secondary air blower 13 is preheated to a predetermined temperature in the high-temperature heat exchanger 6 and then blown in as the secondary air $A_3$ from the air outlet ports in the pipes constituting the gas blowing means 4 counter to the flow of the combustion exhaust gas.

In the combustion apparatus having the above-described arrangement, the amount of primary air that is sent from the bottom of the fluidized bed incineration section 1, that is, the amount of air for fluidizing the fluidizing medium, is held below the theoretical amount of air to effect partial burning of an object for combustion which is fed into the furnace. In this case, the amount of heat generated is small because of partial burning and therefore the temperature of the fluidized bed would otherwise lower; however, the temperature of the fluidized bed is maintained at 400° C. to 900° C. by preheating the primary air sent from the primary air blower 12 to a high temperature (e.g., 500° C.) in the high-temperature heat exchanger 6. The total amount of primary air $A_1$ and the secondary air $A_2$ is controlled in the range of from 1.0 to 1.5 in terms of the air ratio so that a high-temperature oxidizing atmosphere is formed inside the free board section 2. Further, the secondary air $A_3$ is blown in horizontally by the gas blowing means 4 to produce a large whirling flow in the free board section 2 to satisfactorily mix together unburnt gas and combustion air, thereby effecting high-temperature and high-efficiency combustion at 950° C. or higher and with an overall air ratio of 1.2 to 1.7 in the free board section 2 and the post-combustion chamber 3.

Figure 9:
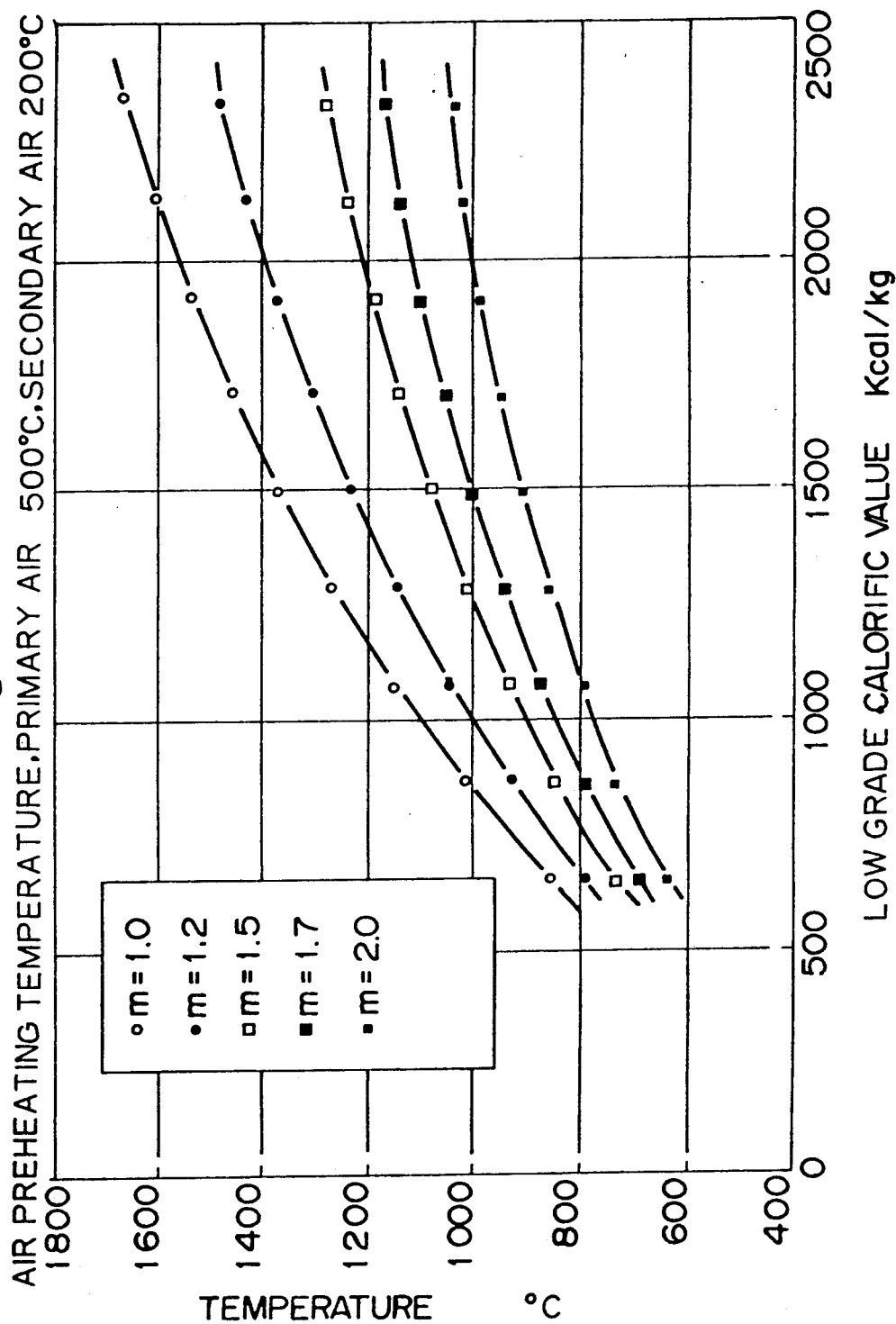
FIG. 9 is a graph showing an example of a calculation of the relationship between the lower calorific value and the combustion gas temperature in the case where the overall air ratio is varied.

FIG. 9 is a graph showing an example of a calculation of the relationship between the overall air ratio m and the combustion gas temperature in the case where the primary air preheating temperature is 500° C. and the preheating temperature of the secondary air $A_2$ blown into the free board section 2 and the secondary air $A_3$ blown in from the gas blowing means 4 is 200° C. In a conventional gas heating type air preheater (a heat exchanger wherein heat exchange is effected between combustion exhaust gas and combustion air), the preheating temperature is set below 300° C. in order to avoid high temperature corrosion of the heating tube by HCl in exhaust gas; therefore, it is difficult for the primary air preheating temperature to exceed 300° C.

In the foregoing embodiment, however, it is possible to preheat combustion air above 300° C. since it employs the high-temperature heat exchanger 6 having a heating tube made of a ceramic material which endures high temperature and has excellent corrosion resistance in the same way as in the case of the pipes 4-2 constituting the gas blowing means 4. Although the preheating temperature differs depending on the combustion gas temperature and the flow rate of preheated air, according to a trial calculation carried out on a practical furnace scale, it is well possible from the thermal point of view to preheat the primary air to 500° C. by effecting heat exchange between the primary air and exhaust gas in the air preheater 8 and then with the combustion exhaust gas at 1200° C. in the high-temperature heat exchanger 6 in the same way as the prior art and, at the same time, preheat the secondary air (the air $A_2$ blown into the free board section 2 and the air $A_3$ blown in from the air blowing means 4) above 200° C. by means of the high-temperature heat exchanger 6.

The lower the air ratio, the higher the combustion temperature, as a matter of course. If the overall air ratio m is assumed to be 1.2, it is possible to incinerate at 1000° C. or higher an object of incineration having a low grade calorific value not lower than 1000 kcal/kg by preheating the combustion air in the high-temperature heat exchanger 6.

In this embodiment, the gas blowing means 4 installed between the free board section 2 and post-combustion chamber 3 and the high-temperature heat exchanger 6 installed between the post-combustion chamber 3 and the gas cooler 7 function as heat screens which prevent lowering in temperature due to radiation; therefore, it is possible to effect combustion at a higher temperature.

Figure 10:
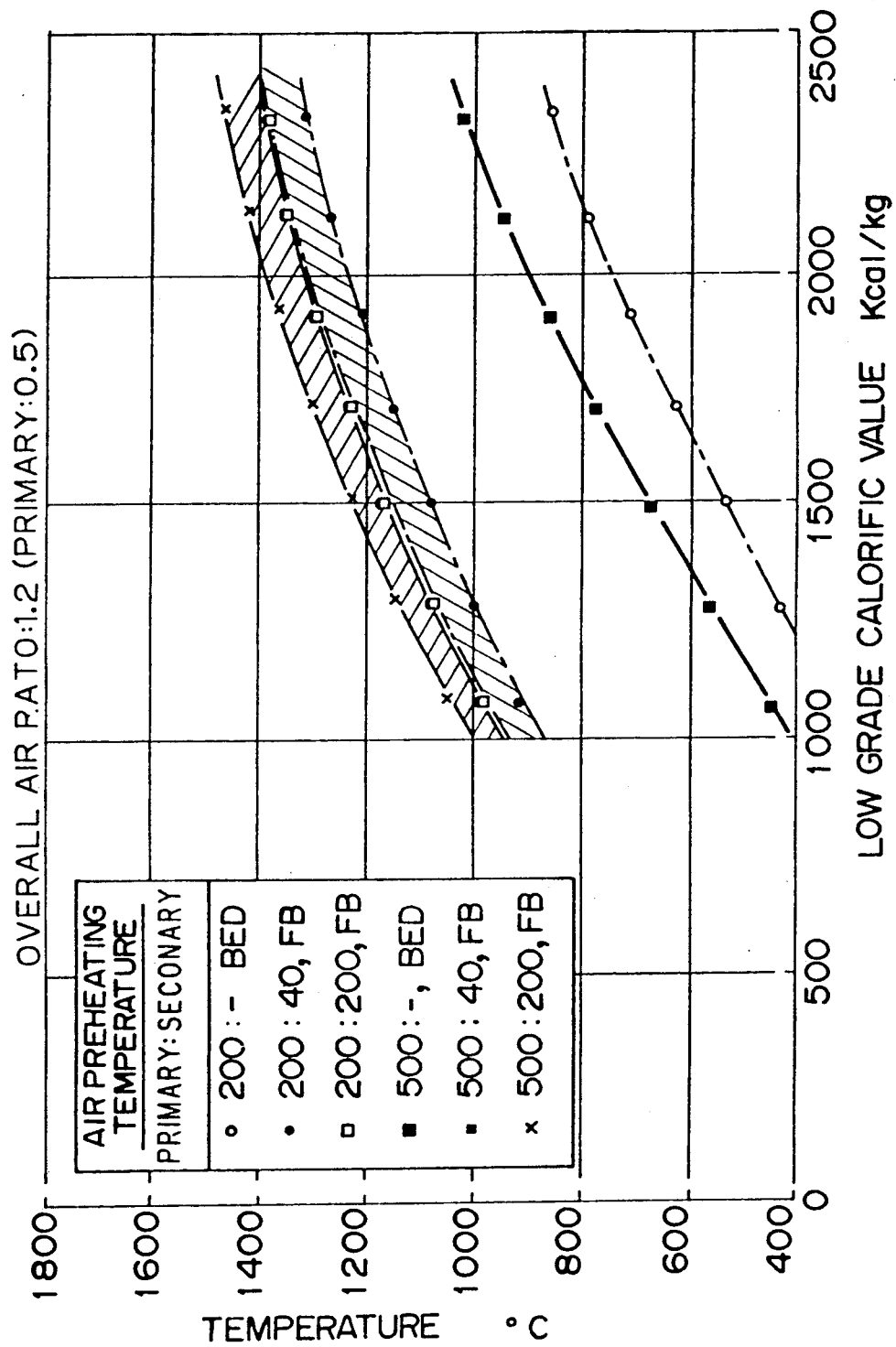
FIG. 10 is a graph showing an example of a calculation of the relationship between the lower calorific value of refuse, the combustion exhaust gas temperature and the fluidized bed temperature in the case where the combustion air temperature is varied.

FIG. 10 is a graph showing the relationship between the temperature of the combustion air, and the temperature of the fluidized bed and the combustion exhaust gas, which shows an example of a calculation in the case where the amount of primary air is 0.5 times the theoretical amount of air and partial burning is effected in the fluidized bed. In the graph, the white circle (○) indicates the temperature of the fluidized bed section (BED) in the case where the primary air is preheated to 200° C.; the black circle (●) indicates the temperature of the free board section (F·B) in the case where the primary air is preheated to 200° C. and the secondary air is at 40° C.; the white square (□) indicates the temperature of the free board section (F.B) in the case where both the primary air and the secondary air are preheated to 200° C.; the large black square (■) indicates the temperature of the fluidized bed section (BED) in the case where the primary air is preheated to 500° C.; the small black square (■) indicates the temperature of the free board section (F.B) in the case where the primary air is preheated to 500° C. and the secondary air is at 40° C.; and the mark (x) indicates the temperature of the free board section (F.B) in the case where the primary air is preheated to 500° C. and the secondary air is preheated to 200° C.

As shown in FIG. 10, in the case of high-calorie refuse, it is possible to effect high temperature burning with ease; rather, it is necessary to lower the temperatures of the fluidized bed and the combustion exhaust gas, whereas, in the case of low-calorie refuse, the preheating temperatures of the primary air and the secondary air play important roles. For example, when the low grade calorific value of the refuse is 1500 kcal/kg, the primary air preheating temperature must be 300° C. or higher in order to maintain the fluidized bed temperature at about 600° C., and it is necessary in order to raise the temperatures of the free board section 2 and the post-combustion chamber 3 to 1200° C. to further effect preheating of the secondary air. The temperature of the fluidized bed at which a fluidization failure occurs due to the reaction with an alkali fusion salt, for example, is defined as the upper limit of the fluidized bed temperature, and the heat decomposition temperature of the object of combustion, or the temperature required to gasify the combustion object, is defined as the lower limit temperature. In general, the temperature range is from 400° C. to 900° C. and the fluidized bed temperature is set at a proper level in accordance with the properties of the objects for combustion. However, it is preferably set within the range of from 500° C. to 800° C. with a view to effecting complete gasification and stabilized burning by slow combustion.

As shown in FIG. 10, when the low grade calorific value of the refuse exceeds 2100 kcal, the fluidized bed temperature becomes higher than 800° C. (see the curve of the white circles) even when the primary air preheating temperature is 200° C. In this case, the fluidized bed temperature can be lowered by reducing the amount of primary air. To lower the fluidized bed temperature, it is also possible to employ known means: for example, water spray may be carried out, or a heat conducting tube may be provided in the fluidized bed (or in a part of the fluidized bed) to effect heat recovery.

When the low grade calorific value of the refuse is 1500 kcal/kg, if the primary air preheating temperature is 500° C., the fluidized bed temperature is about 670° C. (see the curve of the large black squares); therefore, to maintain the fluidized bed temperature at 600° C. it is possible to reduce the amount of primary air. More specifically, the primary air can be preheated to 500° C. by preheating it in two stages employing the conventional air preheater 8 and the high-temperature heat exchanger 6 and it is possible to reduce the amount of primary air that is required to effect stable partial burning in the fluidized bed.

When the low grade calorific value of the refuse is 1000 kcal/kg, the fluidized bed temperature can be maintained at about 400° C. by preheating the primary air to 500° C. (see the curve of the large black squares). When the preheating temperature is not higher than 500° C., it is necessary to increase the amount of primary air to thereby increase the proportion of partial burning in the fluidized bed. The combustion gas temperature in the free board section 2 and the post-combustion chamber 3 is determined by the operating conditions of the fluidized bed and the preheating temperature of the secondary air if the overall air ratio is fixed. As shown in FIG. 10, when the low grade calorific value of the refuse is about 1900 kcal/kg or more, the combustion gas temperature is 1200° C. or higher even when no secondary air preheating is conducted (see the curve of the black circles); in such a case, it is necessary to cool the gas by means of water spray or a boiler. It is also possible to effect heat recovery in the fluidized bed by increasing the proportion of partial burning in the fluidized bed, as a matter of course.

When the low grade calorific value of the refuse is as low as 1000 kcal/kg, it is possible to raise the combustion gas temperature to 1000° C. or higher by preheating the secondary air to about 200° C., as shown in FIG. 10, (see the curve of the marks x).

Although it becomes possible to attain high-temperature combustion in the range of from 1000° C. to 1200° C. and reduce the primary air by lowering the air ratio and preheating the combustion air by means of the high-temperature heat exchanger 6, as described above, it is important in order to effect complete combustion with a low air ratio to thoroughly mix and stir the unburnt gas and the combustion air.

The volume of the free board section 2 is generally set by taking into consideration the required residence time and scattering of the fluidizing medium. However, since the flow velocity of the combustion exhaust gas is about 1 to 3 m/sec., thorough mixing cannot be effected, and there is a limitation on the improvement in mixing of the unburnt gas and the combustion air attained by jetting out the limited amount of secondary air into the free board section 2 from the surrounding furnace wall. Accordingly, it is necessary in the present state of the art to effect an operation with an overall air ratio of about 2.0 in order to reduce the CO concentration in the exhaust gas.

In this embodiment, a multiplicity of pipes 4-2 formed from a heat-resistant material to constitute a gas blowing means 4 are disposed in the vicinity of the boundary between the free board section 2 and the post-combustion chamber 3 and within a plane perpendicular to the flow of the combustion exhaust gas so as to jet out secondary air $A_3$ counter to the flow of the combustion exhaust gas from the air outlet ports 4-3 in the pipes 4-2, thereby enabling the combustion exhaust gas to whirl within the free board section 2 in the form of a large whirling flow while mixing with the secondary air $A_3$. Accordingly, there is no shortpass and consequently the combustion exhaust gas and the secondary air are thoroughly mixed together and the residence time increases. Thus, it is possible to effect complete combustion.

This embodiment is constructed such that the number of structural elements provided inside the free board section 2 is minimized. The reason for this is to avoid trouble caused by incombustible items such as lumps of metal mixed in with the objects for combustion and to enable the combustion objects to be uniformly cast onto the fluidized bed.

The reason why the air ratio in the free board section 2 is set at 1.0 to 1.2 in this embodiment is to prevent accumulation of char which would otherwise be caused by partial burning taking place within the fluidized bed incineration section 1 in a reducing atmosphere with an air ratio not higher than 1.0, to burn the char so as to effectively utilize the calorific value of the objects for combustion, and to prevent unburnt gas from leaking out of the furnace due to variations in the pressure inside the furnace, taking into consideration the safety of the apparatus.

The reason why the fluidized bed incineration section 1, the free board section 2, the post-combustion chamber 3 and the gas cooler 7 are formed integral with each other in this embodiment is to maintain the combustion gas temperature below 1200° C. to provide conditions where fly ash is unlikely to melt and also to obtain a structure where a flue which is likely to cause trouble due to melting of fly ash is eliminated.

Figure 11:
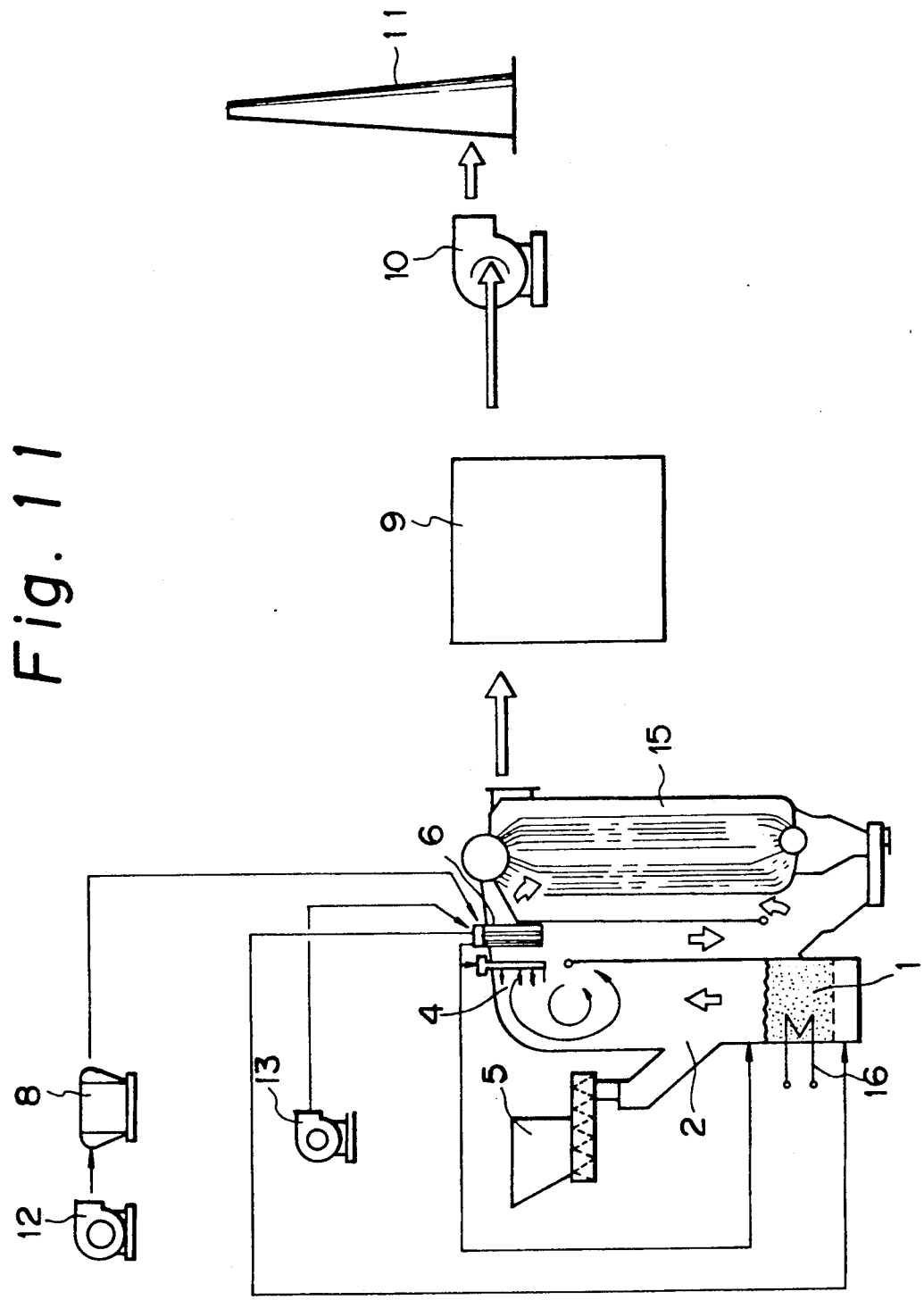
FIG. 11 is a schematic view showing the system arrangement of still another combustion apparatus according to the present invention.

FIG. 11 is a schematic view showing the system arrangement of another combustion apparatus according to the present invention. The combustion apparatus shown in FIG. 11 differs from the combustion apparatus shown in FIG. 8 in that a boiler 15 is employed in place of the gas cooler 7 and that a heat conducting tube 16 is provided in a part of the fluidized bed incineration section 1 to enable heat recovery at the fluidized bed incineration section 1. Since the other points are substantially the same as those of the combustion apparatus shown in FIG. 8, a detailed description of the operation of each section and the combustion control method is omitted.

The arrangement of the combustion apparatus shown in FIG. 11 provides a great improvement in the energy efficiency of the plant when high-calorie refuse is the object of combustion.

Figure 12:
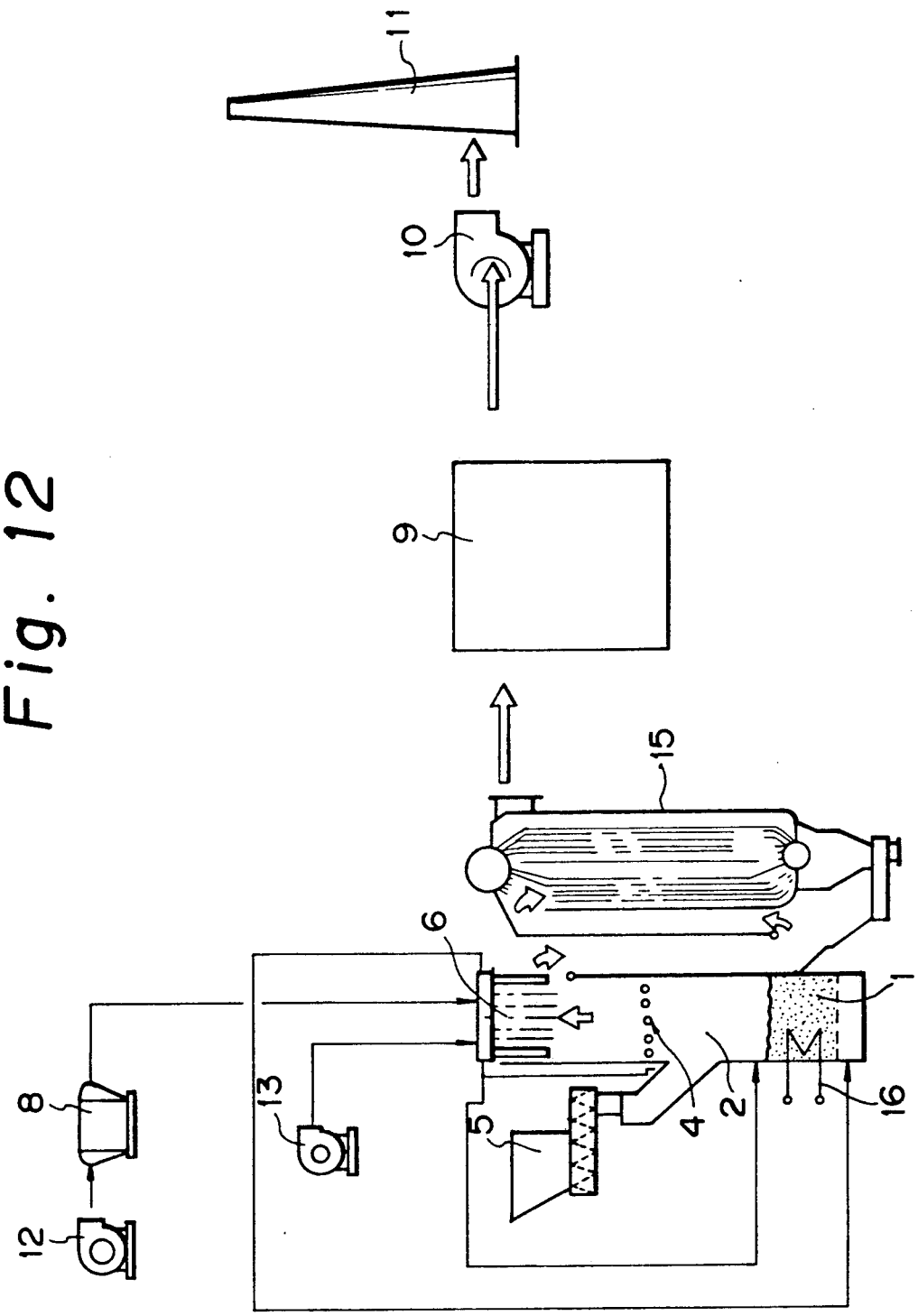

FIG. 12 is a schematic view showing the system arrangement of a further combustion apparatus according to the present invention. As illustrated, this combustion apparatus has a structure wherein the gas blowing means 4 is disposed directly above the free board section 2 and the high-temperature heat exchanger 6 is disposed directly above the gas blowing means 4. In other words, the arrangement is such that the post-combustion chamber is disposed directly above the free board section 2. The structure of the rest of it is the same as that of the combustion apparatus shown in FIG. 11.

With the above-described structure, as the secondary air is blown into the exhaust gas from the gas blowing means 4, a large number of swirls are generated at the downstream side of the gas blowing means 4, although no whirling flow such as that in the foregoing embodiments is generated, so that the secondary air is uniformly mixed in the exhaust gas by the swirls, thus enabling complete combustion to take place in the post-combustion chamber.

The arrangement of the combustion apparatus shown in FIG. 12 also provides a great improvement in the energy efficiency of the plant in the same way as in the case of FIG. 11.

As has been described above, according to the present invention, secondary air is blown in counter to combustion gas by a gas blowing means provided in the vicinity of the boundary between the free board section and the post-combustion chamber to cause the combustion gas and the secondary air to whirl within the free board section in the form of a large whirling flow while mixing with each other, thus enabling combustible gas and unburnt substances to be reliably mixed together with a small amount of secondary air.

Since the gas blowing means comprises a plurality of pipes disposed parallel to each other in the vicinity of the boundary between the free board section and the post-combustion chamber, it is possible to intercept radiation from the combustion exhaust gas at the upstream side of the row of pipes and hence possible to prevent lowering in the temperature due to radiation.

Since the fluidized bed has a low air ratio to effect two-stage combustion based on gasification by partial burning, it is possible to reduce $NO_x$.

High-temperature and high efficiency combustion enables minimization of environmental pollution, for example, reduction in the amount of generation of harmful organic chlorine compounds represented by PCDDs and precursors of these compounds.

High-temperature combustion carried out with a low air ratio enables reduction in the size of the furnace body of the combustion apparatus, draft equipment, devices constituting the gas treating system, etc.

As the result of the foregoing, it becomes possible to lower the running cost. Particularly in the case of a fluidized bed, the running cost can be reduced by a large margin if the amount of fluidizing air can be reduced.

In the case of incineration equipment that employs a boiler as a gas cooler, it is possible to increase the energy efficiency of a plant which incinerates high-calorie refuse as an object for combustion.

INDUSTRIAL AVAILABILITY OF THE INVENTION

Thus, in the combustion apparatus and combustion control method according to the present invention, secondary air is blown in counter to combustion gas by a gas blowing means provided in the vicinity of the boundary between the free board section and the post-combustion chamber to cause the combustion gas and the secondary air to whirl within the free board section in the form of a large whirling flow while mixing with each other, thus enabling combustible gas and unburnt substances to be reliably mixed together with a small amount of secondary air. In addition, the gas blowing means can intercept radiation from the combustion exhaust gas at the upstream side and hence prevent lowering in the temperature due to radiation. Accordingly, when urban refuse or the like is incinerated, it is possible to reduce $NO_x$ and achieve high-temperature and high-efficiency combustion, which enables minimization of environmental pollution, for example, reduction in the amount of generation of harmful organic chlorine compounds represented by PCDDs and precursors of these compounds.

We claim:

1. A combustion apparatus comprising:
a fluidized bed furnace;
a freeboard section above said fluidized bed furnace;
a post-combustion chamber downstream of said freeboard section, said post-combustion chamber being disposed at a position offset from a position directly above said freeboard section and separated from said freeboard section by a boundary; and
a gas blowing means provided in an upper portion of said freeboard section and in the vicinity of the boundary between said freeboard section and said post-combustion chamber and blowing a gas horizontally and in a direction counter to the combustion gas flowing from said freeboard section to a discharge port of said post-combustion chamber for causing the mixed gas constituted of the blown gas and the combustion gas from combustion of material in the fluidized bed furnace and the freeboard section to whirl within said freeboard section in the form of a large whirling flow extending nearly the whole of the vertical portion of the freeboard section and including a downward flow portion in a part of said freeboard section on the opposite side of said freeboard section from said boundary.

2. A combustion apparatus according to claim 1 in which said gas blowing means comprises a plurality of pipes disposed parallel to each other at a predetermined spacing, each pipe being provided with a gas outlet hole for blowing a gas counter to the combustion gas flowing toward the discharge port.

3. A combustion apparatus according to claim 2 in which said gas outlet holes provided in said plurality of pipes, respectively, are out of phase with each other.

4. A combustion apparatus according to claim 1, wherein said pipes are formed from sintered $\beta$-type silicon carbide.

5. A combustion apparatus as claimed in any one of claims 1-4 further comprising a high-temperature heat exchanger connected to said post-combustion chamber and gas cooling equipment downstream of said heat exchanger.

6. A combustion apparatus as claimed in claim 1, in which said gas blowing means is a plurality of vertical pipes each having a plurality of horizontally oriented gas outlets therealong.

7. A combustion control method for operating a combustion apparatus having a fluidized bed furnace, a freeboard section above said fluidized bed furnace, a post-combustion chamber downstream of said freeboard section and disposed at a position offset from a position directly above said freeboard section and separated from said freeboard section by a boundary, and a gas blowing means provided in the upper portion of said freeboard section in the vicinity of the boundary between said freeboard section and said post-combustion chamber oriented for blowing a gas horizontally in a direction counter to the combustion gas flowing from said freeboard section to said post-combustion chamber toward a discharge port therein, said method comprising:

blowing a gas horizontally from said gas blowing means into said freeboard section to create a large whirling flow in said freeboard section extending nearly the whole of the vertical portion of the freeboard section and including a downward flow portion on the opposite side of said freeboard section from said boundary; and blowing primary combustion air in from the bottom of said fluidized bed furnace in an amount not greater than the theoretical amount of air required for complete combustion of material to be combusted in said furnace, so that partial burning of material to be combusted is effected in the fluidized bed furnace, and for maintaining the temperature of said fluidized bed at 400° C. to 900° C.

8. A method as claimed in claim 7 further comprising preheating the primary air blown in from the bottom of said fluidized bed to a predetermined temperature by a two-stage preheating means comprising an air preheater and a high temperature heat exchanger, whereby the amount of heat generated in said fluidized bed furnace can be decreased by reducing the amount of primary air and the temperature of said fluidized bed furnace can be maintained at 400° C. to 900° C.

9. A method as claimed in claim 7 further comprising preheating secondary combustion air to a high temperature in a high temperature heat exchanger and blowing some of the thus preheated secondary combustion air into said freeboard section, controlling the air ratio to be from 1.0 to 1.5 to form a high temperature oxidizing atmosphere, and blowing the remainder of the thus preheated secondary combustion air into said freeboard section by said gas blowing means so as to thoroughly mix together unburnt gas and combustion air, whereby high temperature and high efficiency combustion at 950° C. and higher is effected in said freeboard section and post-combustion chamber with an overall air ratio of 1.2 to 1.7.

10. A method as claimed in any one of claims 7-9, further comprising controlling the temperature of said fluidized bed furnace, the temperature of said freeboard section and the temperature of said post-combustion chamber by varying the air amount ratio among the primary combustion air, the secondary combustion air blown into said freeboard section and the secondary air blown in through said gas blowing means, and also varying the temperatures of said airs.

* * * * *